United States Patent
Ostroff et al.

(10) Patent No.: US 6,201,968 B1
(45) Date of Patent: Mar. 13, 2001

(54) METHOD COMBINING ENTRIES FROM MULTIPLE NEIGHBOR CELL LISTS TO OBTAIN AN UPDATED LIST FOR A SUBSCRIBER DEVICE

(75) Inventors: Jeff L. Ostroff, Margate; Orestes G. Melgarejo, Pembroke Pines; Steven S. Alterman, Davie, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/035,140

(22) Filed: Mar. 5, 1998

(51) Int. Cl.<sup>7</sup> ............................ H04Q 7/20; H04B 7/00
(52) U.S. Cl. ................... 455/436; 455/437; 455/442; 455/443; 455/450; 455/509
(58) Field of Search ..................... 455/436, 437, 455/438, 439, 440, 441, 442, 443, 444, 422, 450, 451, 452, 453, 446, 456, 509, 512, 513, 514, 515; 370/329, 338, 331, 332

(56) References Cited

U.S. PATENT DOCUMENTS

| | | | |
|---|---|---|---|
| 5,222,248 | 6/1993 | McDonald et al. | 455/33.2 |
| 5,260,943 | 11/1993 | Comroe et al. | 370/95.1 |
| 5,276,906 | 1/1994 | Felix | 455/33.2 |
| 5,509,051 | 4/1996 | Barnett et al. | 379/59 |
| 5,649,291 | 7/1997 | Tayloe | 370/332 |
| 5,649,303 | 7/1997 | Hess et al. | 455/63 |
| 5,666,650 | 9/1997 | Turcotte et al. | 370/329 |
| 5,673,307 | 9/1997 | Holland et al. | 379/60 |
| 5,854,981 | * 12/1998 | Wallstedt et al. | 455/439 |
| 5,915,221 | * 6/1999 | Sawyer et al. | 455/437 |
| 5,946,621 | * 8/1999 | Chheda et al. | 455/440 |

* cited by examiner

Primary Examiner—Dwayne Bost
Assistant Examiner—Raymond B Persino
(74) Attorney, Agent, or Firm—Andrew S. Fuller

(57) ABSTRACT

A subscriber unit (405) operating within a radio communication system (600) supplements neighbor list information received from a cell site (428), when that cell site (428) is expected to provide inadequate neighbor cell list information. When the subscriber unit (405) obtains a new neighbor cell list (442) from the cell site (428), it determines whether characteristics of the cell site (428) is such that the new neighbor cell list (442) does not adequately reflect available neighboring cell sites. Such a condition is presumed to exist for a cell site designated as a high site. In such cases, the subscriber unit combines entries from its current neighbor cell list (451) with entries from the new neighbor cell list (442) obtained from the cell site to generate a supplemented neighbor cell list (652). The supplemented neighbor cell list (652) is used to monitor potential server sites, and to make hand-over decisions.

14 Claims, 6 Drawing Sheets

METHOD COMBINING ENTRIES FROM MULTIPLE NEIGHBOR CELL LISTS TO OBTAIN AN UPDATED LIST FOR A SUBSCRIBER DEVICE

TECHNICAL FIELD

This invention relates in general to radio communication systems, and more particularly, to selection of a server site from among multiple server sites.

BACKGROUND OF THE INVENTION

Geographically dispersed transceiver sites are often employed in two-way radio communication systems to support subscribers operating over a wide coverage area. Ordinarily, the sites are arranged such that each provides coverage for a particular geographic region, which may have some overlap. A subscriber interfaces with the radio communication system through a particular transceiver site, referred to herein as a server site. When a subscriber moves from one location to another, it may be advantageous to switch server operations from one site to another, such as a neighboring site, in order to maintain a high quality communication link. The process of switching server sites during an ongoing communication session is generally referred to in the art as hand-off or hand-over. The hand-off decision process usually involves a determination of the quality of signals received by the subscriber from its server site, or vice versa, and the availability and suitability of other potential server sites that may be in communication range of the subscriber. The hand-off decision may be made using information gathered by the server site, information gathered by the subscriber, or a combination of both.

In one prior art example, a subscriber maintains a list of control frequencies used by neighboring sites, and monitors the signal quality and/or other communication parameters for signals emanating from these sites. The information gathered by the subscriber is then used to select a suitable hand-off server site. The list of frequencies representing neighboring sites is referred to herein as a neighbor list or neighbor cell list. The neighbor list is ordinarily downloaded from a server site. A prior art hand-off process is described in U.S. Pat. No. 5,260,943, issued to Comroe, et al., on Nov. 9, 1993, for a TDM Hand-Off Technique Using Time Differences, the entire contents of which are hereby incorporated by reference. Here, a subscriber receives a neighbor list from a site with which it is communicating satisfactorily. This neighbor list is used to determine potential server sites for use when a hand-off becomes necessary.

Sometimes, a subscriber is unable to communicate with its server site because of gaps in coverage, and must hand off to an alternative server site to maintain an ongoing communication session. Such gaps in coverage may be caused by interference from a building, hilly terrain, and the like. One solution is to provide one or more high sites, i.e., server sites having a wide coverage area to fill in such gaps in coverage, as potential server sites in the neighbor list, to enable the subscriber to hand off to such sites. When a subscriber hands off to a new server site, it is current practice to replace its neighbor list with one downloaded from the new server site. However, a high site may be geographically far removed from the subscriber, and thus a neighbor list obtained from the high site may not have entries of sites that are within communication range of the subscriber at its current location. Consequently, a subscriber replacing its neighbor list with one downloaded from the high site may be unable to access available server sites that are within range, thereby experiencing poor performance or lost calls.

It is desirable to provide for an enhanced radio communication system in which a subscriber has adequate neighbor list information to determine potential server sites for establishing or maintaining communication. A preferred solution would provide backwards compatibility for existing system components.

DETAILED DESCRIPTION OF THE PREFERRED EMBODIMENT

The present invention provides for an enhanced radio communication system in which a subscriber unit has adequate neighbor list information to determine potential server sites for establishing or maintaining communication. Particularly, a subscriber unit, operating from a stored neighbor cell list, obtains a new neighbor cell list from a *particular cell site, such as one with which it is affiliated. The subscriber unit determines whether the characteristics of the particular cell site is such that the new neighbor cell list does not adequately reflect available neighboring cell sites. When such a condition exists, the subscriber unit combines entries from the stored neighbor cell list with entries from the new neighbor cell list to obtain an updated neighbor cell list. The updated neighbor cell list is used to monitor potential server sites, and to make hand-over decisions.

Figure 1:
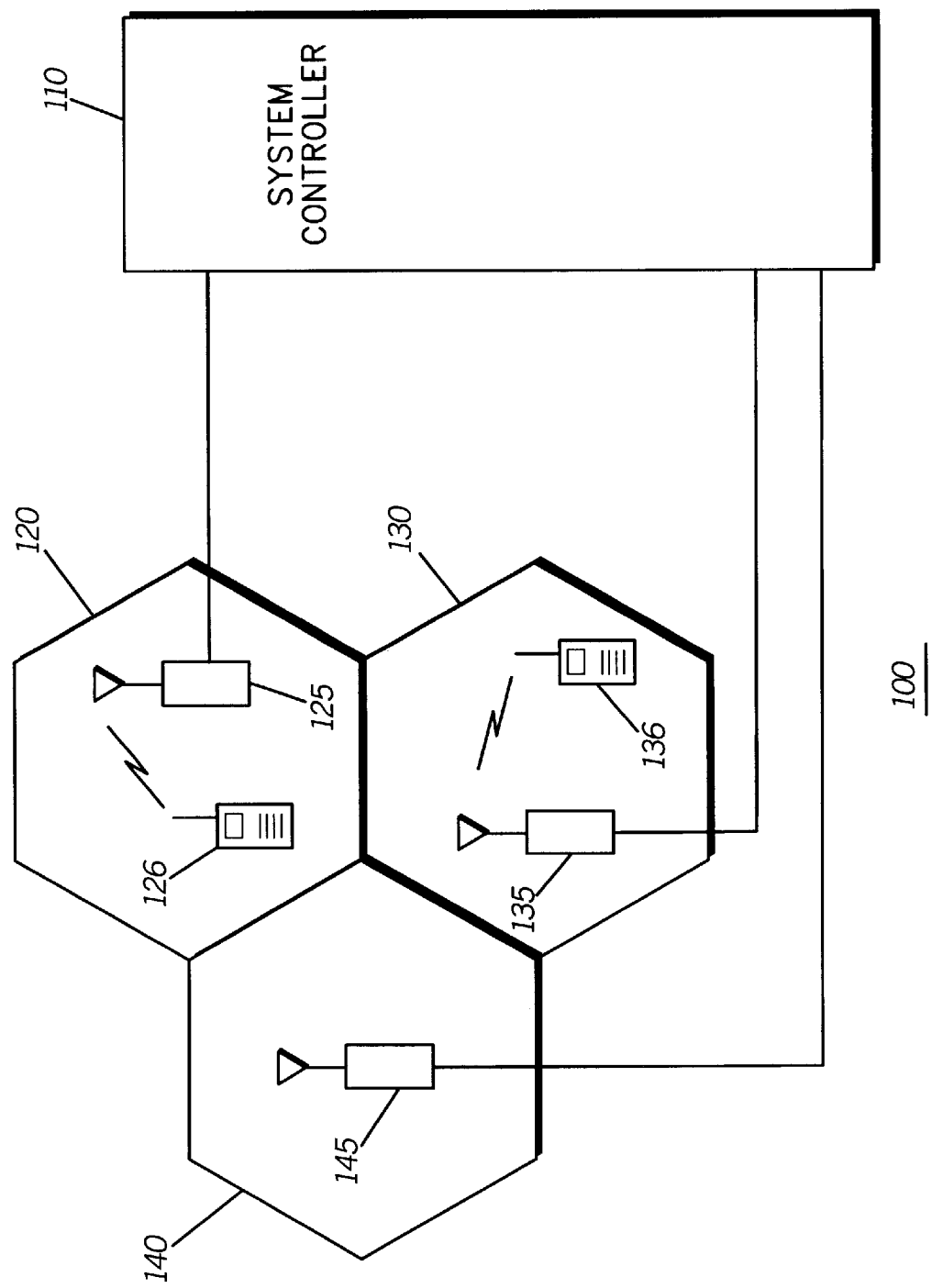
FIG. 1 is a representation of a radio communication system operating in accordance with the present invention.

FIG. 1 shows a block diagram of a radio communication system 100, operating in accordance with the present invention. In the preferred embodiment, the communication system 100 provides a radio network infrastructure that supports telephone, dispatch, data, and other communication services over a wireless network. Wireless communications occur over the network using a time division multiplexed (TDM) channel access, which is described in more detail below.

The system 100 includes a system controller 110, communication cell sites 125, 135, 145, and subscriber units 126, 136. The controller 110 includes computational and communication equipment that implement management functions for the radio communication system 100. For example, the controller 110 manages and coordinates communication access to and from each subscriber unit 126, 136 through the cell sites 125, 135, 145, and allocates communication resources at each cell site. Additionally, the controller 110 coordinates communication between participants of the communication system and entities (not shown) external to the system 100, such as to a public switched telephone network, and the like. The system 100 has a coverage area that includes separate coverage regions 120, 130, 140, which typically overlap (overlapping not shown). Each coverage region is supported by one of the cell sites 125, 135, 145. The cell sites 125, 135, 145 preferably comprise radio transceivers that function as base stations. The cell sites 125, 135, 145 are configured to support subscriber communication within their respective coverage regions.

The subscriber units 126, 136 are two-way wireless devices, such as portable or mobile two-way radio transceivers, or other electronic device with a wireless communication portion. Generally, a subscriber unit operates within the radio system 100 through an affiliated cell site using communication resources, such as wireless frequencies, allocated for use by that cell site. The affiliated cell site is referred to herein as a server cell site or server site. Oftentimes, a subscriber unit moves from the coverage area of a first cell site into the coverage area of a second cell site. To maintain a communication link, cell site affiliation is transferred from the first cell site to the second cell site. This process is known as hand-over or hand-off. Hand-off protocols for TDM systems are known in the art as is exemplified in U.S. Pat. No. 5,159,593, issued to D'Amico, et al. on Oct. 27, 1992, for Channel Acquisition and Hand-Off Method and Apparatus for a TDMA Communication System. Usually, the communication system is formed such that the coverage area of one cell site partially overlaps the coverage area of another cell site. Thus, at a given location and time, there may be two or more cell sites which could function as a server cell site for the subscriber unit. Generally, a mechanism using factors such as received signal strength, signal reception quality, user preference, and other such parameter, are combined in an algorithm to determine which cell site to use. According to the present invention the subscriber unit maintains a list (referred to herein as a "monitor list" or "neighbor cell list") that contains information needed for monitoring neighboring cell sites to determine potential server cell sites.

Figure 2:
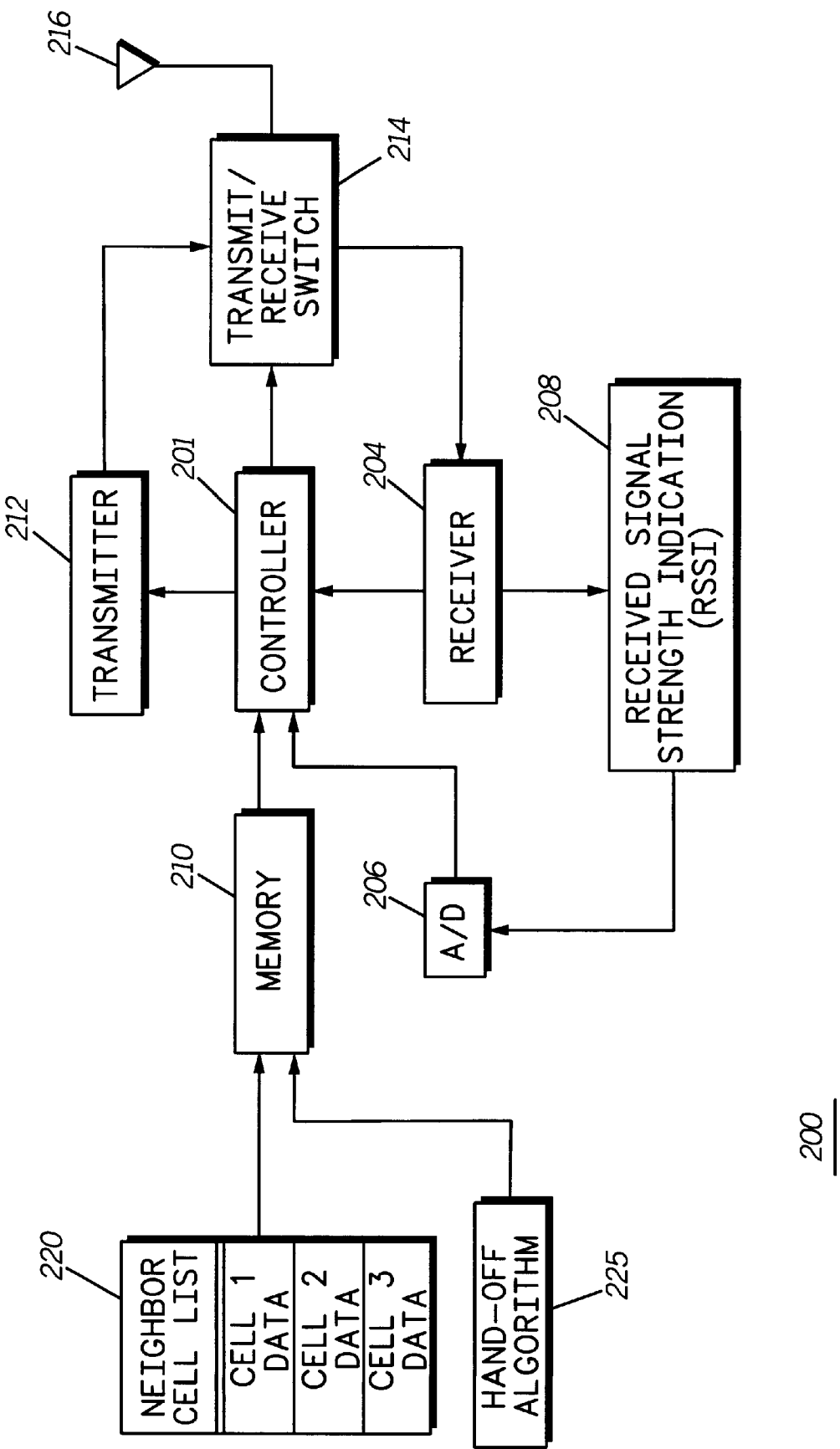
FIG. 2 is a block diagram of a subscriber unit, in accordance with the present invention.

FIG. 2 is a block diagram of a subscriber unit 200, in accordance with the present invention. The subscriber units 126, 136 of FIG. 1 are of similar construction. A controller 201 provides operational control for the subscriber unit 200 by executing well-known instructions which are stored in a coupled memory 210. The subscriber unit 200 selectively receives signals through an antenna 216 which is coupled to a transmit/receive (T/R) switch 214. When receiving, the T/R switch 214 is under the control of the controller 201 which effects the coupling of the antenna 216 to a receiver 204. The receiver 204 decodes the received signals and presents those signals to the controller 201 for processing. A transmitter 212 is operably coupled to the controller 201. For transmit operations, the T/R switch 214 is positioned so that the transmitter 212 can operate through the antenna 216.

The memory 210 also stores a neighbor cell list 220, that contains a set of communication channels, frequencies, or other communication resources, to be monitored by the subscriber unit 200, in order to determine a potential server cell site. Ordinarily, the neighbor cell list is downloaded from a server cell site in an over-the-air transmission, and contains access and other information for neighboring cell sites to the server cell site.

The subscriber unit 200 operates to monitor the cell sites represented on the neighbor cell list to detect signals transmitted by cell sites that are within communication range of the subscriber unit 200. The controller 201 receives a received signal strength indication (RSSI) signal from a RSSI circuit 208. The RSSI is related to the strength of the received signal. The RSSI circuit 208 uses an analog to digital converter 206 to present a digital RSSI to the controller 201. Using the RSSI signal, the controller 201 determines information regarding the proximity of the cell site to the subscriber unit 200. Preferably, the communication channels monitored corresponds to control channels on which information pertaining to the identification and characteristics of the cell site is transmitted. The information collected is used to rank each cell site according to its suitability as a potential server cell site. The subscriber unit 200 makes site affiliation decisions according to a hand-off algorithm 225 stored in memory 210, which hand-off algorithm 225 employs the RSSI and signal quality estimates based on noise and interference information.

Figure 3:
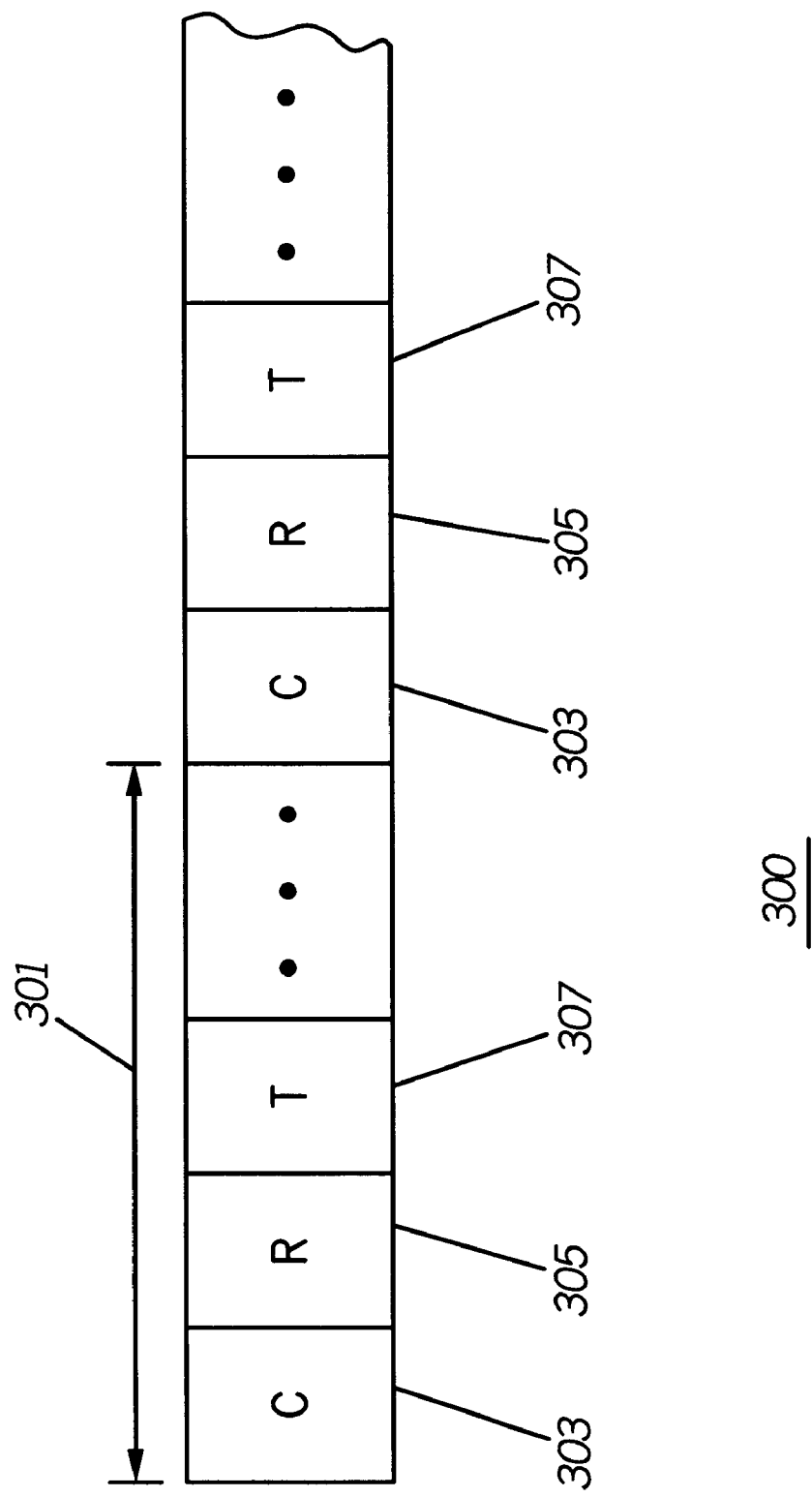
FIG. 3 is a block representation of a time division multiplexing protocol frame, in accordance with the present invention.

As mentioned earlier, the system operates using TDM channel access procedures. Under the TDM channel access procedures, a communication resource, such as a wireless carrier frequency, is divided into time frames, and the frames are subdivided into time slots. FIG. 3 shows a block representation 300 of such a TDM frame. In this particular TDM frame 301, the first time slot 303 is designated as a control slot in which resource management information is communicated. In a typical implementation, there is frequent communication activity on the control slot 303. Communication on the control slot includes resource allocation and management information, identification information, and the like. Other slots 305, 307 are designated as transmit and receive slots. In some implementations, transmit and receive slots are implemented in separate frames. Several communication units may share a frame, each with its designated slot for transmit or receive operations. With this arrangement, a subscriber unit may be engaged in communications with another subscriber unit or other communicant during its transmit and receive slots, but generally has time between receive and transmit operations (dead time), and during periods of communication inactivity for monitoring and other purposes. According to the present invention, the subscriber unit uses available time to monitor for potential server cell sites, and to perform update of its neighbor cell list as needed.

Figure 4:
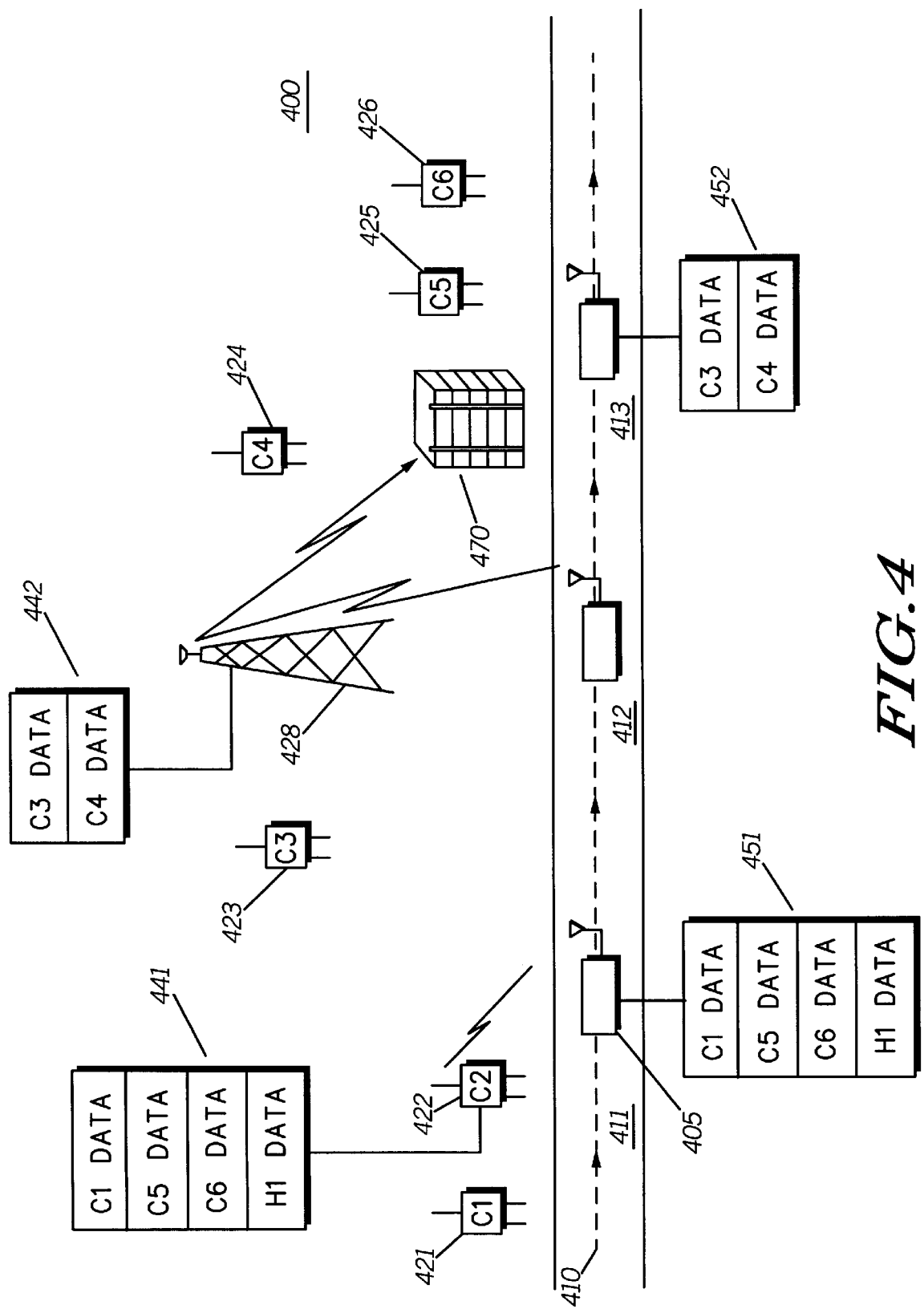
FIG. 4 shows a radio communication system, in which a subscriber unit encounters a problem solved by the present invention.

FIG. 4 highlights a scenario of a problem solved by the present invention. A communication system 400, such as described with respect to FIG. 1, has geographically dispersed cell sites 421, 422, 423, 424, 425, 426, 428, labeled C1, C2, C3, C4, C5, C6, and H1, respectively, that provide in combination coverage to a wide geographic area. As shown, the cell sites labeled C1, C2, C3, C4, C5, and C6 provide limited coverage within a localized area. The cell site H1 is a high site having a wide coverage area, and is intended to provide fill-in coverage in areas not covered by a cell site that provides localized service. Each cell site 421, 422, 423, 424, 425, 426, 428 typically has a neighbor cell list that contains frequency, channel, and other information needed to access and affiliate with neighboring cell sites. By way of example, the cell site labeled C2 has a neighbor cell list 441 containing data for the C1, C5, C6, and H1 cell sites. Similarly, the cell site labeled H1 has a neighbor cell list 442 containing data for the C3 and C4 cell sites. A subscriber unit 405 traversing a path 410 is shown at various locations 411, 412, 413 along the path 410. At location 411, the subscriber unit 405 is affiliated with cell site 422, i.e., the cell site is functioning as a server cell site. Accordingly, the subscriber unit downloads the neighbor cell list 441 available from this cell site 422 and stores a corresponding list 451 in memory. At location 412, the subscriber unit 405 is outside coverage range of cell site 422 or any other local cell site. Consequently, the subscriber unit affiliates with the high site 428 which provides fill-in coverage. The subscriber unit also obtains the neighbor cell list 442 available at the high site 428, and stores a corresponding version 452 as its new neighbor list. As is the case with other cell sites, the neighbor cell list 442 available from the high site 428 contains information on neighboring cell sites 423, 424. At location 413, communication between the subscriber unit 405 and the high site 428 is interrupted by a building 470. Although local cell sites 425, 426 are available as potential server sites, the subscriber unit is unable to take advantage of these cell sites 425, 426, as there is no information concerning these cell sites 425, 426 in the subscriber unit's neighbor cell list 452.

Figure 5:
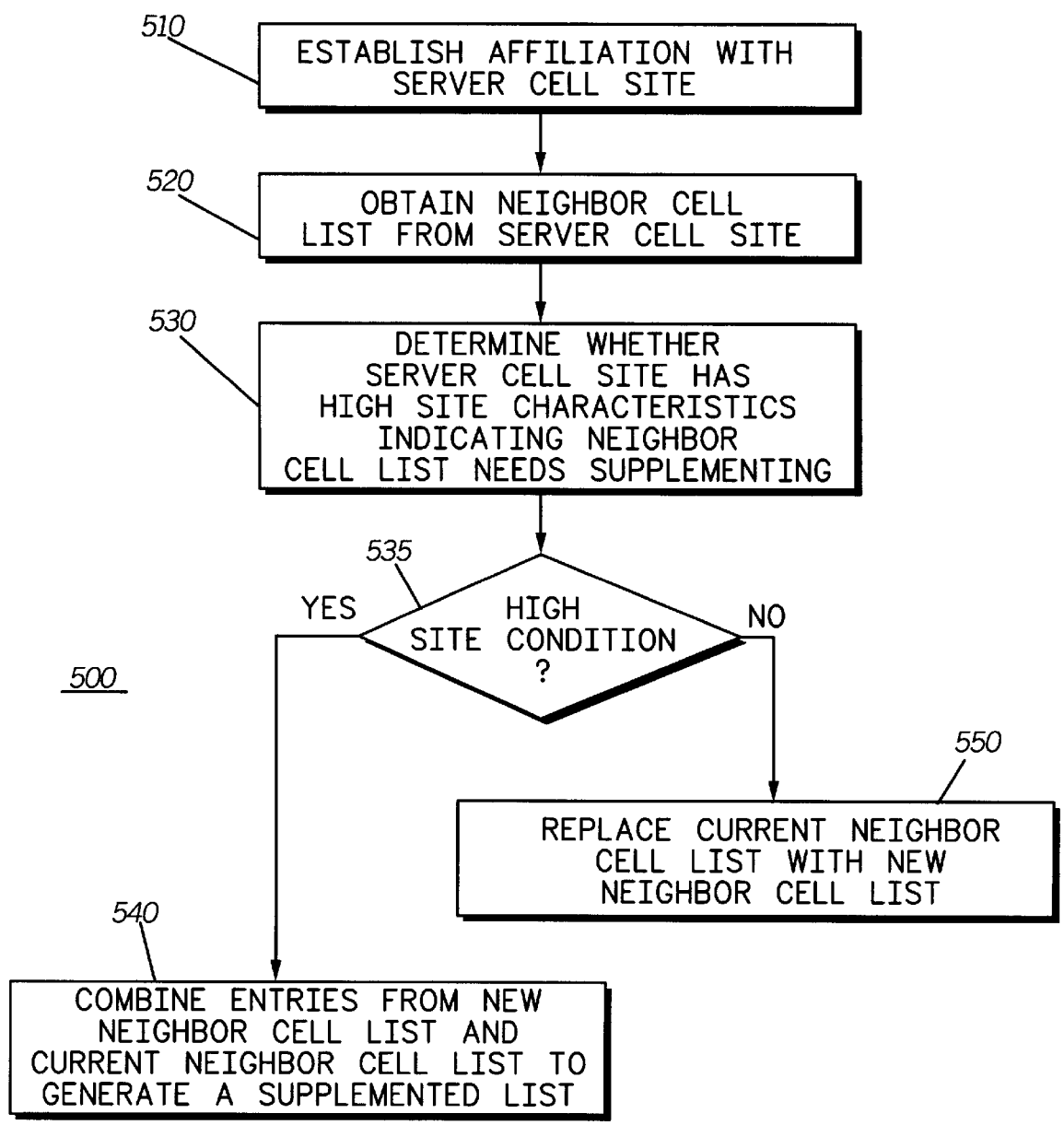
FIG. 5 is a summary of procedures used by the subscriber unit to generate a neighbor cell list, in accordance with the present invention.
Figure 6:
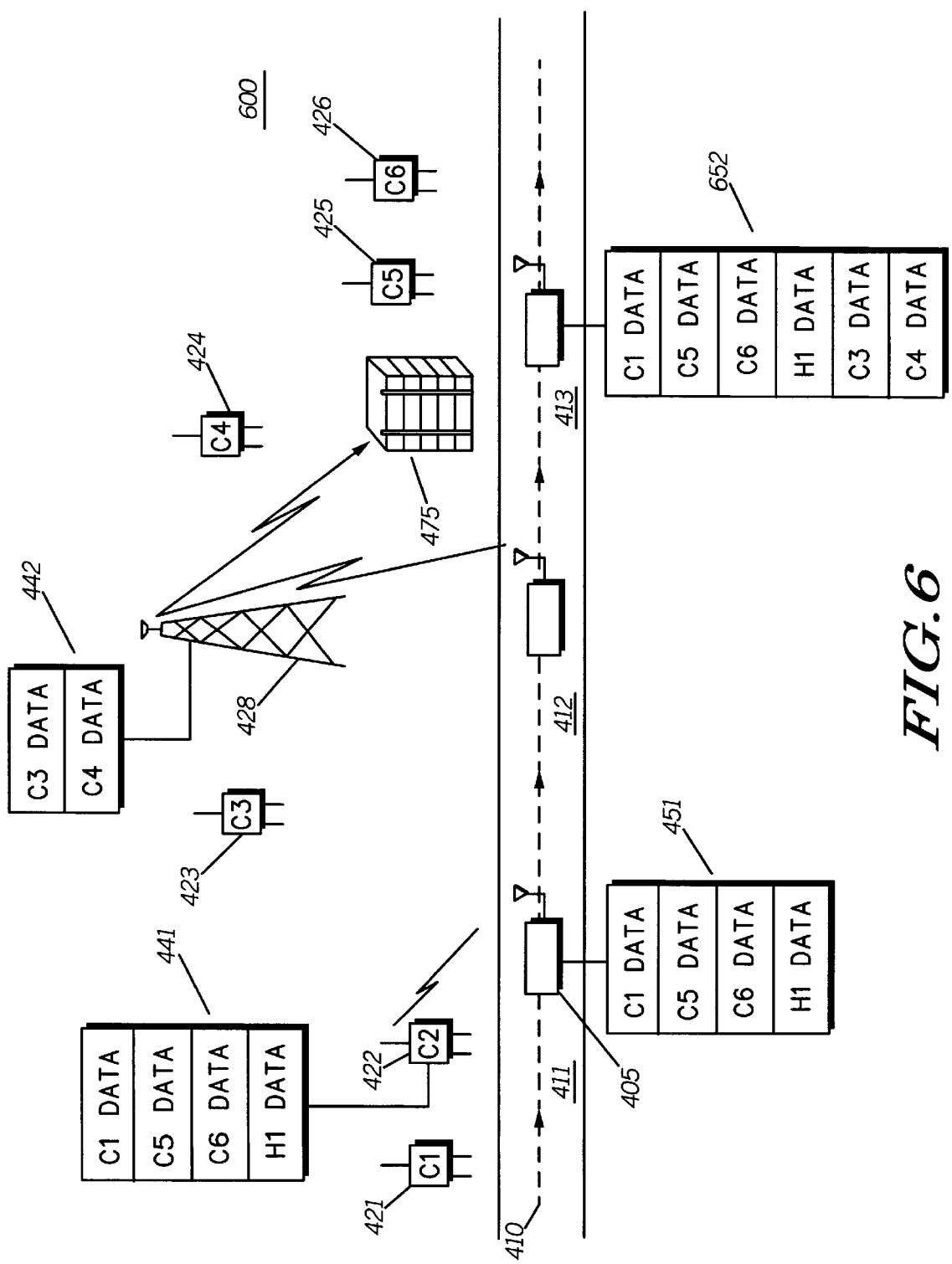
FIG. 6 shows an updated version of the communication system FIG. 4, in which the subscriber unit operates in accordance with the present invention.

FIG. 5 is a summary of procedures 500 used by the subscriber unit 405 in order to ensure that it has adequate neighbor list information to determine potential server sites for establishing or maintaining communication, in accordance with the present invention. FIG. 6 shows a communication system 600 in which the subscriber unit 405 takes advantage of the concepts of the present invention to solve the problem discussed with respect to FIG. 4. Recall that at location 411, the subscriber unit 405 is affiliated with cell site 422 such that cell site 422 operates as the subscriber unit's server site. Further, the subscriber has downloaded a neighbor cell list from the cell site 422 and has stored the corresponding neighbor cell data as its current neighbor cell list 451. At location 412, the subscriber unit is no longer able to satisfactorily communicate with cell site 422, and selects cell site 428 as a suitable server site using its current neighbor cell list 451.

With reference to FIGS. 5 and 6, the operation of the subscriber unit according to the present invention will now be described. At location 412, the subscriber unit switches affiliation from cell site 422 to cell site 428 using information from its neighbor cell list, i.e., affiliation is established with cell site 428, step 510. The subscriber unit obtains, by way of download, the neighbor cell list 442 downloadable from cell site 428, step 520. The subscriber unit determines whether a condition exists in which the neighbor cell list obtained does not adequately reflect available neighboring cell sites based on a particular designation for the server cell site, step 530. This would indicate that the neighbor cell list obtained needed to be supplemented or modified. Such a condition is presumed to exist when the server cell site 428 has a high site classification, i.e., the server cell site 428 has a designation indicating wide area coverage when compared to other cell sites. In the preferred embodiment, the subscriber unit determines that it needs a modified neighbor cell list when it receives a parameter from the server cell site over a control channel, which parameter indicates that the cell site has high site characteristics.

Upon determining that a high site condition exist, step 535, the subscriber unit operates to combine entries from the neighbor cell list downloaded with entries from the current or previously obtained neighbor cell list to obtain an updated or supplemented neighbor cell list 652, step 540. In one embodiment, all the entries from the current obtained neighbor cell list are combined with all entries from the downloadable neighbor cell list to form the new list 652. In another embodiment, some or all the entries from the downloaded neighbor cell list are combined with some but not all of the entries from the current neighbor cell list. A selection criteria for combination may include use of only the recently used or highest ranked cell sites from the current neighbor cell list.

When a high site or other such condition does not exist to indicate inadequacy of the downloaded neighbor cell list, the current neighbor cell list is replaced by the downloaded neighbor cell list, step 550. The downloaded or updated neighbor cell list is made current and used for making hand-over and other site selection decisions.

By using a combined neighbor cell list when affiliated with high sites, a subscriber unit has access to additional neighbor cell sites that are not neighbors to the high site. Thus, a subscriber unit that performs a hand-off to a high site because of a temporary gap in coverage, may switch affiliation to other cell sites when the high site is no longer the most suitable server site. The problem of high site stranding, commonly encountered in some prior art systems, is addressed by the present invention.

What is claimed is:

1. In a radio communication device, a method comprising the steps of:

establishing affiliation with a server site selected from a current neighbor cell list stored at the radio communication device;

downloading a new neighbor cell list from the server site;

determining whether the new neighbor cell list downloaded needs to be supplemented based on a particular characteristic of the server site;

when the new neighbor cell list needs to be supplemented, replacing the current neighbor cell list with a list derived from a combination of entries from the current neighbor cell list and the new neighbor cell list; and when the new neighbor cell list does not need to be supplemented, replacing the current neighbor cell list with the new neighbor cell list.

2. The method of claim 1, wherein the step of determining whether the new neighbor cell list needs to be supplemented, comprises the step of determining that the new neighbor cell list needs to be supplemented when the server site is designated a high site.

3. In a radio communication system having a subscriber unit and multiple cell sites, including a particular cell site having a downloadable neighbor cell list containing entries of cell data for neighboring cell sites, the subscriber unit having a previously obtained neighbor cell list, a method comprising the steps of:

establishing affiliation between the subscriber unit and the particular cell site;

determining whether the subscriber unit needs a modified neighbor cell list based on a particular designation for the particular cell site;

when the subscriber unit needs a modified neighbor cell list, replacing the previously obtained neighbor cell list at the subscriber unit with a new list derived from a combination of entries from the previously obtained neighbor cell list and the downloadable neighbor cell list; and when the subscriber unit does not need a modified neighbor cell list, replacing the previously obtained neighbor cell list with the downloadable neighbor cell list.

4. The method of claim 3, wherein the step determining whether the subscriber unit needs a modified neighbor cell list, comprises the step of determining that the subscriber unit needs a modified neighbor cell list when the particular cell site has a designation indicating wide area coverage when compared to other cell sites.

5. The method of claim 3, wherein the step determining whether the subscriber unit needs a modified neighbor cell list, comprises the step of determining that the subscriber unit needs a modified neighbor cell list when the particular cell site is designated as a high site.

6. The method of claim 5, wherein the step determining whether the subscriber unit needs a modified neighbor cell list, comprises the step of receiving, by the subscriber unit, a parameter from the particular cell site over a control channel, which parameter indicates a high site.

7. The method of claim 3, wherein the step of replacing the previously obtained neighbor cell list at the subscriber unit with a new list, comprises the step of combining entries representing recently used cell sites from the previously obtained neighbor cell list with entries from the downloadable neighbor cell list to form the new list.

8. The method of claim 3, wherein the step of replacing the previously obtained neighbor cell list at the subscriber unit with a new list, comprises the step of combining all entries from the previously obtained neighbor cell list with all entries from the downloadable neighbor cell list to form the new list.

9. In a radio communication system having a subscriber unit, a method at the subscriber unit comprising the steps of:

affiliating with a first server site;

downloading a first neighbor cell list from the first server site;

switching affiliation from the first server site to a second server site using information from the first neighbor cell list;

determining whether the second server site has a high site classification;

downloading a second neighbor cell list from the second server site; and replacing the first neighbor cell list with a new list containing a combination of entries from the first neighbor cell list and the second neighbor cell list when the second server site has a high site classification.

10. The method of claim 9, wherein the new list contains all of the entries from the second neighbor cell list but only some of the entries from the first neighbor cell list.

11. The method of claim 9, wherein the new list contains all of the entries from the second neighbor cell list and all of the entries from the first neighbor cell list.

12. The method of claim 9, wherein the step determining whether the second server site has a high site classification, comprises the step of receiving a parameter from the second server site over a control channel, which parameter indicates that the second server site is a high site.

13. In a radio communication system having a subscriber unit and a plurality of cell sites, a method at the subscriber unit comprising the steps of:

obtaining a neighbor cell list from a particular cell site;

determining whether a condition exists in which the neighbor cell list does not adequately reflect available neighboring cell sites;

combining entries from the neighbor cell list with entries from at least one other neighbor cell list to obtain an updated neighbor cell list, when the condition exists; and making hand-over decisions using the updated neighbor cell list.

14. The method of claim 13, wherein the at least one other neighbor cell list comprise a previously used neighbor cell list.

* * * * *